(12) United States Patent
Whitehouse et al.

(10) Patent No.: US 10,523,132 B2
(45) Date of Patent: Dec. 31, 2019

(54) START-UP OF HVDC CONVERTERS (71) Applicant: General Electric Technology GmbH, Baden (CH)

(72) Inventors: Robert Whitehouse, Stafford (GB); Carl Barker, Walton Stone (GB)

(73) Assignee: General Electric Technology GmbH, Baden (CN)

( * ) Notice: Subject to any disclaimer, the term of this patent is extended or adjusted under 35 U.S.C. 154(b) by 0 days.

(21) Appl. No.: 15/529,689

(22) PCT Filed: Nov. 12, 2015

(86) PCT No.: PCT/EP2015/076400
§ 371 (c)(1),
(2) Date: May 25, 2017

(87) PCT Pub. No.: WO2016/083138
PCT Pub. Date: Jun. 2, 2016

(65) Prior Publication Data
US 2017/0331393 A1 Nov. 16, 2017

(30) Foreign Application Priority Data

Nov. 25, 2014 (EP) .................................. 14194757

(51) Int. Cl.
*H02M 3/135* (2006.01)
*H02M 7/517* (2006.01)
*H02M 1/36* (2007.01)
*H02M 7/49* (2007.01)
*H02J 3/40* (2006.01)

(52) U.S. Cl.
CPC ............. *H02M 7/517* (2013.01); *H02M 1/36* (2013.01); *H02M 7/49* (2013.01); *H02J 3/40* (2013.01)

(58) Field of Classification Search
CPC .. H02M 3/135; H02M 1/36; H02J 3/36; H02J 3/005; H02J 3/006; H02J 9/04–061; Y10T 307/615–625
(Continued)

(56) References Cited

U.S. PATENT DOCUMENTS 4,133,026 A * 1/1979 Hausler ...................... H02J 3/36
363/49
5,764,502 A * 6/1998 Morgan .................... H02J 4/00
307/66
(Continued)

FOREIGN PATENT DOCUMENTS

EP 2 036 181 A1 3/2009
WO 2014/075740 A1 5/2014

OTHER PUBLICATIONS

Bahrman, M. and Bjorklund, P.E., "The New Black Start: System Restoration with Help from Voltage-Sourced Converters," IEEE Power and Energy Magazine, vol. 12, Issue 1, pp. 44-53 (Jan./Feb. 2014).
(Continued)

*Primary Examiner* — Jeffrey A Gblende
*Assistant Examiner* — Nusrat Quddus
(74) *Attorney, Agent, or Firm* — Eversheds Sutherland (US) LLP (57) ABSTRACT

A method and apparatus for start-up of a voltage source converter (VSC) which is connected to an energized DC link (DC+, DC−). The VSC is connected to a first AC network via a first transformer and an AC isolation switch, the AC isolation switch being coupled between the first transformer and the AC network. The method involves using an auxiliary AC power supply to generate an AC supply to energize the first transformer with the AC isolation switch open. The VSC is then started, with a VSC controller using the AC supply generated by the auxiliary AC power supply as a
(Continued)

reference for controlling the VSC. The auxiliary AC power supply may also be used to supply power to at least one VSC load, such as the controller and/or an auxiliary load such as a cooling system. Once the VSC is started the isolation switch 204 can be closed.

13 Claims, 6 Drawing Sheets

(58) Field of Classification Search
USPC ............... 363/49–55, 56.01–56.12, 57, 58
See application file for complete search history.

(56) References Cited

U.S. PATENT DOCUMENTS

| | | | | |
|---|---|---|---|---|
| 5,910,689 | A | * | 6/1999 | Ertz, III ............... H02J 9/065 |
| | | | | 307/64 |
| 9,213,345 | B2 | * | 12/2015 | Butler ................. H03F 1/52 |
| 9,667,162 | B2 | | 5/2017 | Gaudenz et al. |
| 2011/0013441 | A1 | | 1/2011 | Gruber et al. |
| 2016/0064936 | A1 | * | 3/2016 | Satake ................. H02J 3/32 |
| | | | | 307/20 |
| 2016/0156275 | A1 | * | 6/2016 | Ilic ................. H05B 33/0806 |
| | | | | 315/209 R |

OTHER PUBLICATIONS

Extended European search report issued in connection with corresponding EP Application No. 14194757.2 dated Jun. 10, 2015.
International Search Report and Written Opinion issued in connection with corresponding PCT Application No. PCT/EP2015/076400 dated Feb. 19, 2016.
International Preliminary Report on Patentability issued in connection with corresponding PCT Application No. PCT/EP2015/076400 dated May 30, 2017.
First Office Action and Search issued in connection with corresponding CN Application No. 201580064227.5 dated Sep. 29, 2018 (Machine translation of Office Action not available).

* cited by examiner

START-UP OF HVDC CONVERTERS

FIELD OF INVENTION

This application relates to methods and apparatus for start-up of voltage source converters forming part of a high voltage power transmission/distribution network and especially for methods and apparatus for start-up of voltage source converters as part of a process of starting or restarting a connected AC network.

BACKGROUND TO THE INVENTION

HVDC (high-voltage direct current) electrical power transmission uses direct current for the transmission of electrical power. This is an alternative to alternating current electrical power transmission which is more common. There are a number of benefits to using HVDC electrical power transmission. HVDC is particularly useful for power transmission over long distances and/or interconnecting alternating current (AC) networks that operate at different frequencies. A first station may therefore transmit electrical energy to a second station over a DC transmission line, e.g. an overhead line or subsea or buried cable. The first station may generate the DC supply by conversion from a received AC input supply. The second station then typically provides conversion back from DC to AC. Each of the first and second stations may therefore typically comprise a converter for converting from AC to DC or vice versa.

Initially HVDC power transmission systems tended to be implemented for point-to-point transmission, i.e. just from the first station to the second station. Increasingly however it is being proposed to implement HVDC power transmission on a mesh-network or DC grid comprising a plurality of DC transmission paths connecting more than two voltage converters. Such DC networks are useful, for example, in applications such as electrical power generation from renewable sources such as wind farms where there may be a plurality of sources that may be geographically remote.

To date most HVDC transmission systems have been based on line commutated converters (LCCs), for example such as a six-pulse bridge converter using thyristor valves. LCCs use elements such as thyristors that can be turned on by appropriate trigger signals and remain conducting as long as they are forward biased. In LCCs the converter relies on the connected AC voltage to provide commutation from one valve to another.

Increasingly however voltage source converters (VSCs) are being proposed for use in HVDC transmission. HVDCs use switching elements such as insulated-gate bipolar transistors (IGBTs) that can be controllably turned on and turned off independently of any connected AC system. VSCs are thus sometime referred to as self-commutating converters.

Various designs are VSC are known. In one form of known VSC, often referred to as a six pulse bridge, each valve connecting an AC terminal to a DC terminal comprises a set of series connected switching elements, typically IGBTs, each IGBT connected with an antiparallel diode. The IGBTs of the valve are switched together to connect or disconnect the relevant AC and DC terminals, with the valves of a given phase limb being switched in antiphase. By using a pulse width modulated (PWM) type switching scheme for each arm, conversion between AC and DC voltage can be achieved.

In another known type of VSC, referred to a modular multilevel converter (MMC), each valve comprises a series of cells connected in series, each cell comprising an energy storage element, such as a capacitor, and a switch arrangement that can be controlled so as to either connect the energy storage element in series between the terminals of the cell or bypass the energy storage element. The cells are often referred to as sub-modules with a plurality of cells forming a valve module. The sub-modules of a valve are controlled to connect or bypass their respective energy storage element at different times so as to vary over the time the voltage difference across the valve. By using a relatively large number of sub-modules and timing the switching appropriately the valve can synthesize a stepped waveform that approximates to a sine wave and which contain low level of harmonic distortion.

In normal use the VSCs of the HVDC stations are typically controlled with reference to the AC waveform of the relevant connected AC network to achieve a desired power flow. Thus, the AC waveform is used as an external reference for controlling switching of the VSC.

At times, there may be a need to start-up at least part of such a power transmission/distribution network, for instance on first initialization of a new AC or DC network or following a power outage or blackout in an existing AC network. In such case, there may be no existing AC waveform for the VSC control to use as an external reference and the normal control of the VSC may not function correctly until a sufficiently stable AC voltage has been provided.

Usually starting or restarting an AC network, which is sometimes referred to as a "black start", requires starting the voltage generators connected to the AC network in sequence with one generator supplying power for the next generator. For example, a diesel generator may be used to supply local power to a power generation station. This local power generation may energize at least part of the AC network to a sufficient extent to enable another power generator to be enabled and so on until the network has reached a stable level, where normal control may be enabled. Any connected HVDC stations are conventionally started and energized from the AC system.

It has been proposed however that a VSC connected to an AC network can be used to start-up an AC network. Thus, if a first VSC is connected to a first AC network which is dead and the first VSC can receive power via a DC link from a second VSC, which may be connected to a second, functioning AC network, the first VSC may be operated to start-up the first AC network. The first VSC can be used as a voltage generator to generate an AC voltage within the first AC network.

A first VSC connected to a dead AC network may be used to generate an AC waveform for re-starting the dead AC network, the first VSC receiving power via a DC link from a second VSC connected to a functioning AC network. The second VSC maintains the voltage of the DC link at the nominal voltage of the DC link.

BRIEF DESCRIPTION OF THE INVENTION

It will be appreciated by one skilled in the art that, in a black start process, the first VSC may itself be in a blocked state and may need to be energized before being started. A possible distinction is how the VSC connected to the dead AC network may be started. In addition, it will also be appreciated that various auxiliary functions of a VSC converter station must be operational in order to be able to use the VSC and in a black start situation there will be no power available from the connected AC network. As an example, VSCs typically require cooling of the switching elements, e.g. the IGBTs, and some VSCs use water based cooling systems. It is therefore necessary for coolant such as water to be pumped through the VSC other valve elements would rapidly overheat. In addition, the coolant must be continuously deionized in order to ensure that the conductivity of the coolant remains sufficiently low. Thus, the cooling system of the VSC station must be operational in order for the VSC to be used to start the connected AC which requires a suitable power supply.

Embodiments of the present invention relate to methods and apparatus for control of a VSC for start-up of the VSC.

Thus according to an aspect of the present invention there is provided a method of start-up of a voltage source converter which is connected to: an energized DC link; and a first AC network via a first transformer and an AC isolation switch, the AC isolation switch being coupled between the first transformer and the AC network; the method comprising: using an auxiliary AC power supply to generate an AC supply to energize the first transformer with the AC isolation switch open; and starting the voltage source converter using the AC supply generated by the auxiliary AC power supply as a reference for controlling the voltage source converter.

The method according to this aspect thus uses an auxiliary AC power source to energize the main VSC transformer when disconnected from the AC network by an AC isolation switch, which may be a main isolation switch or AC breaker as would be understood by one skilled in the. The auxiliary AC power source may thus be separate to, and independent of, the first AC network. The auxiliary AC power source also provides an AC power supply which can be used as an external reference for the VSC control. As mentioned above and as will be appreciated by one skilled in the art in normal use the VSC control is based on AC waveform of the connected AC network. The method of this aspect allows the auxiliary AC supply waveform to be used for control during start-up of the VSC.

The method may further comprise powering at least one load of the voltage source converter using the auxiliary AC power supply. The at least one load may be a system of the VSC converter station that may be operational during the start-up process. The at least one load may comprise at least one of: a controller for the voltage source converter; and a cooling system for the voltage source converter. The auxiliary supply can thus ensure that the necessary control and protection systems of the VSC are fully operational as it is energized and started, even if there is no source of power from the connected first AC network. In some embodiments, the auxiliary AC power supply may be connected to the first transformer via an auxiliary power isolation switch and the auxiliary power isolation switch may be closed only after the auxiliary AC power supply is powering said at least one load of the voltage source converter. In other words, the VSC auxiliary systems may be powered before energizing the main converter transformer.

In some embodiments, the auxiliary AC power supply may be coupled to a winding of the first transformer, e.g. a tertiary winding of the first transformer. In other embodiments, the auxiliary AC power supply may coupled to a node between the voltage source converter and the AC isolation switch via an auxiliary transformer.

In some instances, the first AC network may be an active AC network with AC power. In which case the method may comprise, after starting the voltage source converter, using the AC power of the first AC network, i.e. the AC waveform(s) of the first AC network, as an external reference for controlling the voltage source converter. In other words, the auxiliary AC power supply may be used as a reference during initial starting of the VSC, but once the VSC is operational the control may switch to using to the AC waveform(s) of the connected first AC network as the reference. This can allow the VSC to substantially synchronize to the first AC network before the AC isolation switch, i.e. main AC breaker, is closed. The method may therefore comprise closing the AC isolation switch when the voltage source converter is substantially synchronized to the first AC network.

The method of start-up is also operable in instances when the first AC network is without power. In such cases the method may comprise starting the VSC as described above, with the AC isolation switch open so that the VSC is disconnected from the first, dead, AC network as the VSC is being started and the transformer energized. Once the VSC is operational and stable the AC isolation switch may be closed. When the AC isolation switch is closed the VSC can start to provide power to the first AC network as part of a start-up process for the first AC network. In some instances, the auxiliary AC power supply may be operating and connected to the first transformer at the point when the AC isolation switch is closed.

Especially when connecting to an AC network that was previously without power the method may involve at least one current limiting resistor being connected in series with the voltage source converter at the point when the AC isolation switch is closed. The current limiting, or soft start, resistor(s) may only be used for a relatively short time following closing the AC isolation switch and thus the method may comprise subsequently bypassing the at least one current limiting resistor.

As mentioned the method may be part of a black start process of the first AC network which further comprises using the AC power provided by the voltage source converter to the first AC network to start at least one additional AC generator connected to the first AC network.

It will be appreciated therefore that the VSC may be energized from the DC link. The method may comprise a step of using the DC link to energize the VSC, i.e. any VSC capacitances etc. prior to starting the VSC.

In another aspect, there is provided apparatus for start-up of a voltage source converter connected to an energized DC comprising: a first transformer coupled to the voltage source converter; an AC isolation switch coupled between the first transformer and an AC network; an auxiliary AC power supply; and a start-up controller for operating said auxiliary AC power supply to generate an AC supply to energize the first transformer with the AC isolation switch open.

The system of this aspect provides all the same benefits and may be configured to implement any of the variants of the first aspect described above.

In particular, the auxiliary AC power supply may be configured to supply power to at least one load of the voltage source converter. A VSC controller may be configured to control the voltage source converter using the AC supply generated by the auxiliary AC power supply as a reference.

BRIEF DESCRIPTION OF THE DRAWINGS

The invention will now be described by way of example only with reference to the accompanying drawings, of which.

DETAILED DESCRIPTION

Embodiments of the present invention relate to methods and apparatus for start-up of a voltage source converter (VSC) in a high voltage direct current (HVDC) power transmission network. At least some embodiments are suitable for start-up of a VSC as part of a black start process for an AC network connected to that VSC but the methods and apparatus may also be applicable to start-up of VSCs connected to functioning AC networks.

Figure 1:
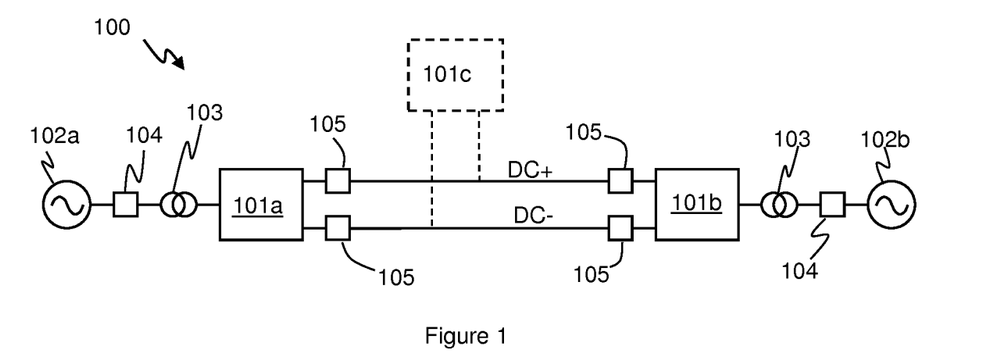
FIG. 1 illustrates a high voltage DC power distribution/transmission network.

FIG. 1 illustrates one example of a HVDC power distribution/transmission network 100. A first VSC station 101A is connected to a second VSC station 101B by a DC link, DC+ and DC−. Typically, the first and second VSC stations may be remote from one another and thus the DC link may comprise overhead transmission lines and/or cables, which may be buried and/or submarine cables. However back-to-back arrangements are known where the VSCs are effectively co-located and used to tie two AC networks.

The first VSC station 101A is connected to a first AC network 102A and the second VSC station 101B is connected to a second AC network 102B. At least one of the first and second AC networks, say AC network 102B, may be an AC power transmission or distribution grid. In such an AC power distribution/transmission grid there may be multiple sources of power generation connected to the grid. For instance, there could be another HVDC station and/or any other type of power generator, for example a coal or gas fired power station, nuclear power station, hydroelectric plant, solar array etc.

As distributed generation becomes more common there may also be a number of relatively small scale generators connected to the AC grid. In use such an AC grid therefore represents an active load for the VSC 101B. It will be appreciated of course that the VSC will typically be connected to the AC network with paths for multiple AC phases, e.g. three AC phases.

In some instances, the first AC network 102A could be an AC power generation network, for instance a wind farm power generation network or the like which may, for example, be located offshore or in some other remote location.

Typically, the VSC stations 101A and 101B may be connected to their respective AC network 102A and 102B by a suitable transformer 103. In addition, there will be at least one AC breaker/isolation switch 104. The DC side network will also typically comprise DC breakers/isolation switches 105. One skilled in the art will appreciate that in practice that there may be many additional components and FIG. 1 illustrates a simplified arrangement for ease of explanation.

In some instances, there may be more than two VSC stations connected to the DC grid, for instance there may be at least a third VSC station 101C.

There will be at least some instances where it will be necessary to start at least one of the VSCs of the stations 101A and 101B of such a network. For instance, on initial start of the HVDC link there will be a need to energize and start both VSCs. Following a fault on the network at least one of the VSCs may be blocked and there will be a need to restart such a converter. In some instances, the VSC may be started as part of a black start process for starting up the connected AC network.

In embodiments of the present invention an auxiliary AC power source associated with the VSC is used to energize the main VSC transformer and to provide a reference AC waveform for control of the VSC converter. The auxiliary AC power source may also be used to provide power for one or more auxiliary loads of the VSC converter station which may be necessary or desirable for converter operation.

Figure 2:
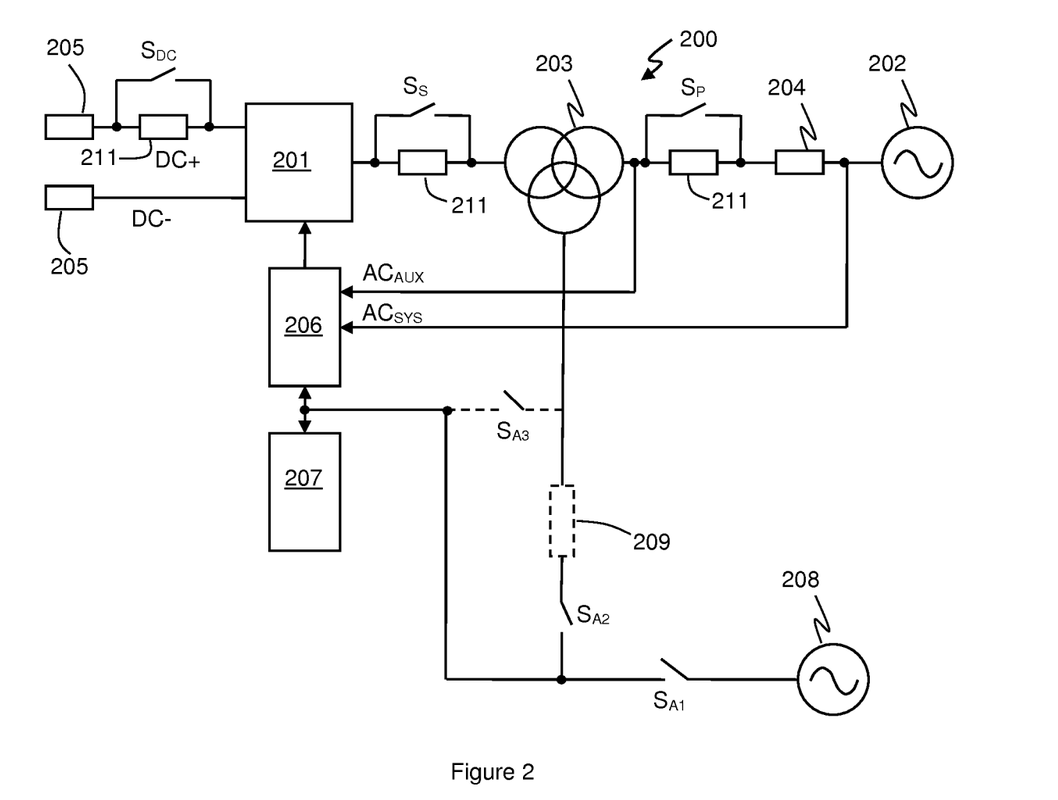
FIG. 2 illustrates a VSC start-up system according to an embodiment.

FIG. 2 illustrates a system 200 for start-up of a VSC 201 according to an embodiment. The VSC is connected to an AC network 202 via a transformer 203. The AC network may be connected to a primary winding of the transformer 203 and the VSC 201 to a secondary winding. There is an AC breaker/isolation switch 204 located between the transformer 203 and the AC network 202.

The VSC 201 is also connected to a high side DC link, DC+ and low side DC link, DC− via DC breakers 205.

The VSC 201 has an associated controller 206 for controlling operation of the VSC, i.e. for controlling the switching of the valves of the VSC. In addition to the controller 206 there is at least one auxiliary load 207 such as a cooling system.

In the system of FIG. 2 an auxiliary AC power source 208 is also associated with the VSC. In this embodiment, the auxiliary AC power source 208 provides power to the VSC controller 206 and at least one other auxiliary load during the start-up process. In addition, the auxiliary AC power source also energizes the transformer 203 and provides at least one reference AC waveform for the VSC controller 206. In the example of FIG. 2 the auxiliary AC power source 208 is coupled, via at least one isolation switch/breaker $S_{A1}$, $S_{A2}$, to a tertiary winding of the transformer 203 but alternatively the auxiliary AC power source could be connected via an auxiliary transformer, for example between the primary of transformer 203 and the AC breaker 204.

To explain the start-up process it will be assumed that the DC lines up to the DC breakers 205 are energized by another VSC. For example, with reference to FIG. 1, the VSC 201 could be that illustrated by VSC station 101b. In such this example VSC station 101A is operational and connected to an operating AC network 102A which is generating power. The VSC station 101A can thus energies the DC link.

Referring back to FIG. 2 the DC breakers/isolation switches 105 may initially at least be open. The AC isolation switch/breaker 204 is also open, thus isolating the VSC 201 and transformer 203 from the AC network 202. The AC network 202 may be a dead network, i.e. a network without any sources of AC power, or may be an operating active AC network.

The auxiliary power source 208, which may for instance be a suitable diesel generator, or a battery powered static electronic converter or the like, is started to provide power for control and/or protection systems of the VSC. The auxiliary power source should be sufficient to provide power for these functions of the VSC during start-up. The auxiliary power source should also be capable of feeding the main converter transformer magnetization current. This may be achieved by a relatively low power auxiliary AC power supply. Switch $S_{A1}$ may be closed so that power is supplied to the VSC controller 206 and to the auxiliary loads 207, such as the VSC cooling system.

Initially the auxiliary AC power source may be isolated from transformer 203 by switch/breaker $S_{A2}$ being open.

The DC breakers 205 may be closed so that the DC poles of the VSC are energized and the various capacitances of the VSC can be brought up to the operating voltage.

The VSC is still blocked from operating however.

At an appropriate point the auxiliary isolation switch/breaker $S_{A2}$ is closed so that the auxiliary AC power source energizes the transformer 203. The switch/breaker $S_{A2}$ may be closed once the auxiliary load voltages are established and may be timed to mitigate any effect of energizing the transformer on the AC auxiliary load voltages.

In some instances, the auxiliary power source may be connected to the transformer 203 via an impedance 209 which may serve to help limit any in-rush current to the transformer. Once switch $S_{A2}$ is closed, the AC supply from the auxiliary AC power supply 208 will start energizing the transformer 203. The transformer magnetizing current may tend to drag the auxiliary AC voltage down, which could disturb operation of the auxiliary loads 207 and/or VSC control 206. The presence of impedance 209 may therefore serve to reduce any disturbance on the AC voltages supplied to the auxiliary loads. Impedance 209 is illustrated between the power supply 208 and switch $S_{A1}$ but it will be appreciated that other options are possible, for instance the impedance could be between switch $S_{A2}$ and the transformer and/or could be accompanied with a selectable bypass path. If impedance 209 is present then, in some embodiments, there may be a selectable path, e.g. a bypass path with a switch $S_{A3}$, to provide a path between the transformer 203 and the VSC controller 206 and/or auxiliary loads 207, to allow the VSC controller 206 and/or auxiliary loads 207 to be powered from the AC supply generated by the VSC 201 once started.

It will be clear therefore that the transformer is energized separately from the AC network 202. In the method proposed in EP2,036,181 it appears that the transformer is energized by starting the VSC with the AC breaker is closed so that the transformer and AC network are energized together.

At this point the VSC 201 can be deblocked and started. The VSC controller 206 receives an indication, ACAux, of the AC waveform generated by the auxiliary AC waveform (in this example the resulting waveform on the primary side of the transformer) and uses this as a reference waveform for the VSC control. The VSC thus has a working AC system to synchronize to. The VSC 201 is thus initially controlled with reference to AC waveform generated by the auxiliary AC power source 208.

If the connected AC network is an operational active network, i.e. with AC power, the VSC may then be synchronized to this network before closing the AC breaker. In this case the VSC controller 206 may receive an indication ACsys of the AC waveform(s) of the connected AC network. Power for the VSC controller 206 and other auxiliary loads can at this stage be taken from the output of the VSC, e.g. by closing switch $S_{A3}$. Once the VSC is synchronized to the AC network 202 the AC breaker 204 can be closed to connect the VSC to the AC network. At this point the auxiliary AC power source may be isolated from the transformer, e.g. by opening switch $S_{A1}$, and/or may be shut down.

If the AC network 202 is however a dead network, i.e. a network without power, then there is no network waveform to synchronize to and the AC breaker may be closed once the VSC has reached steady operation. In some embodiments, the auxiliary AC power supply may be shut down and/or isolated from the transformer during the initial start-up of the dead network as the auxiliary supply can come from the AC system established by the VSC. In practice, however there may be transient disturbance in the AC voltages when the AC isolation switch 204 is closed, thus in some embodiments the auxiliary AC power supply may be kept connected during this period.

In some embodiments, one or more current limiting resistors 211 may be provided in the current path to limit in-rush current. When starting a dead AC network the nature of the load, e.g. size/power factor etc., may be unknown, and thus the magnitude of the inrush current to be expected upon closing the main AC breaker is also unknown.

Thus at least one resistance, often referred to as a "soft-start resistor", may be inserted in series with the converter on first closing the main AC breaker. Such resistors are often fitted to conventional VSCs in order to limit any inrush current into the converter during start-up of the converter from the AC system. A soft start resistor 211, with an associated bypass switch path, may be located on one or both of the secondary side or the primary side of transformer and/or on either or both DC poles of the DC system. The soft start resistor(s) may therefore be used when the VSC is starting the AC system as this will limit the inrush current from the converter into the unknown AC system load. As with a conventional start up the "soft start" resistor is shorted out of service when power transmission is established.

Figure 3:
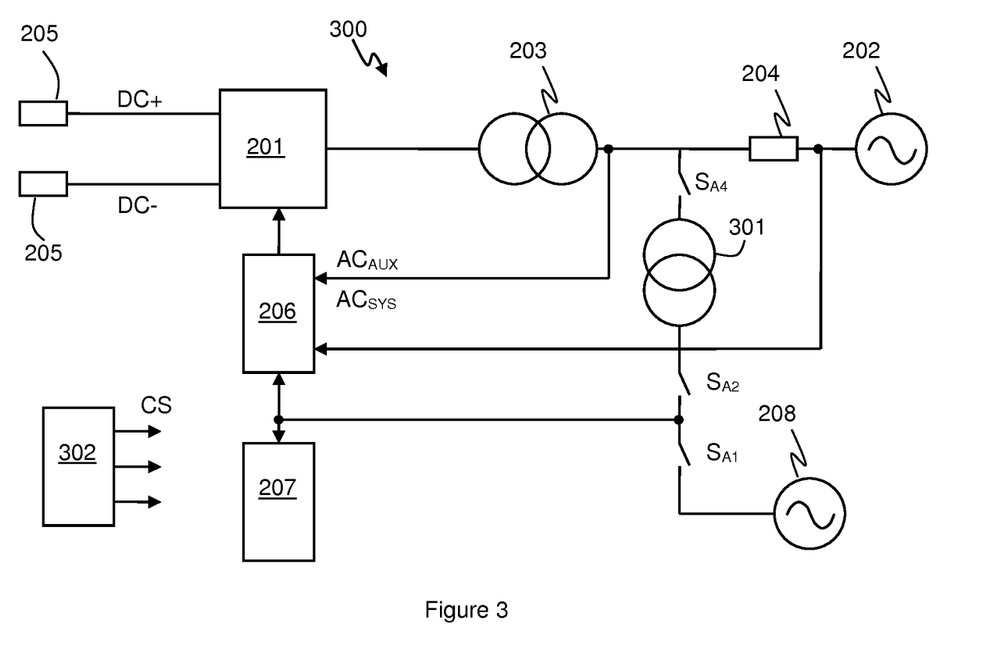
FIG. 3 illustrates a VSC start-up system according to another embodiment.

As mentioned above the auxiliary AC power source may be connected to a tertiary winding of transformer 203. In other embodiments, however the auxiliary AC power source may be connected to an auxiliary transformer as illustrated in FIG. 3. FIG. 3 shows a system 300 where similar components as described above with reference to FIG. 2 are identified using the same reference numerals. In the system of FIG. 3 the auxiliary AC power source 208 is connected to an auxiliary transformer 301. The primary winding of auxiliary transformer 301 may be connected between the VSC and the AC breaker 204 with the auxiliary power source connected to the secondary winding. FIG. 3 illustrates the auxiliary transformer connected between transformer 203 and the AC breaker but in some instances, it may be possible to have the connection point between the VSC 201 and transformer 203. There may in some embodiments be a switch $S_{A4}$ for isolating the auxiliary transformer 301, in which case there may be no need for switch $S_{A2}$ FIG. 3 also illustrates that there may be a start-up controller 302 for generating various control signals CS for controlling the auxiliary AC power source 208 and isolation switches $S_{A1}$, $S_{A2}$, $S_{A3}$ and $S_{A4}$ if present during start up.

To demonstrate the principles of the embodiments of a start-up of an HVDC VSC converter station connected to a dead AC network was simulated. The simulated HVDC system was a 500 MW/300 kV VSC point to point scheme. The nominal rating of the AC system was 150 kV$_{rms}$.

The simulated initial conditions are: the main AC breaker 204 and the soft start resistor bypass switches, $S_{DC}$, $S_S$, $S_P$ are open; the VSC converter 201 is blocked; the auxiliary AC power supply is off; and the DC system is already energized by the remote VSC, which is modelled as a voltage source.

DC and AC disconnectors were not modelled in this simulation. For clarity in modelling it was assumed that the VSC capacitances etc. were energized from the DC system—although in practice the auxiliary AC power source may be started before the DC breakers are closed.

Figure 4:
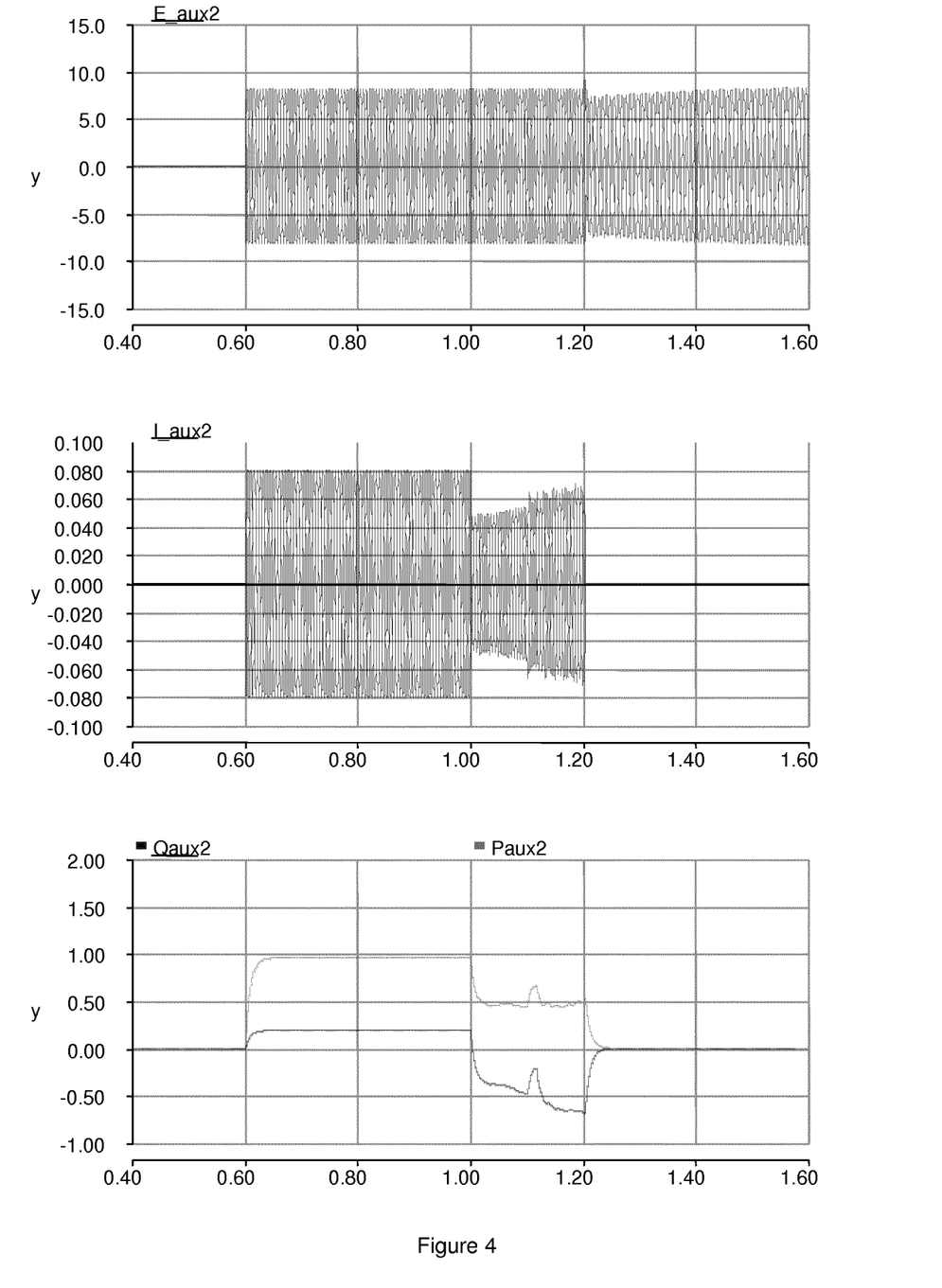
FIG. 4 illustrates simulated waveforms for the auxiliary AC power supply at the transformer during a start-up process.
Figure 5:
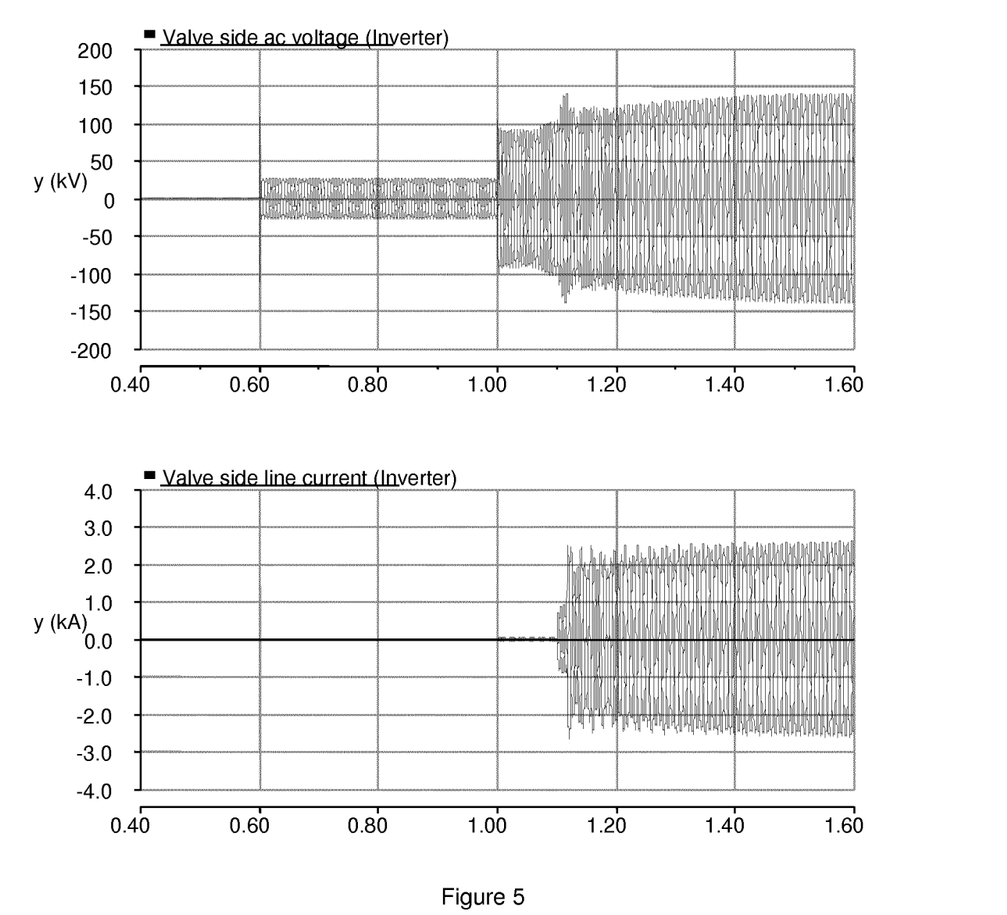
FIG. 5 illustrates the simulated converter valve winding waveforms.
Figure 6:
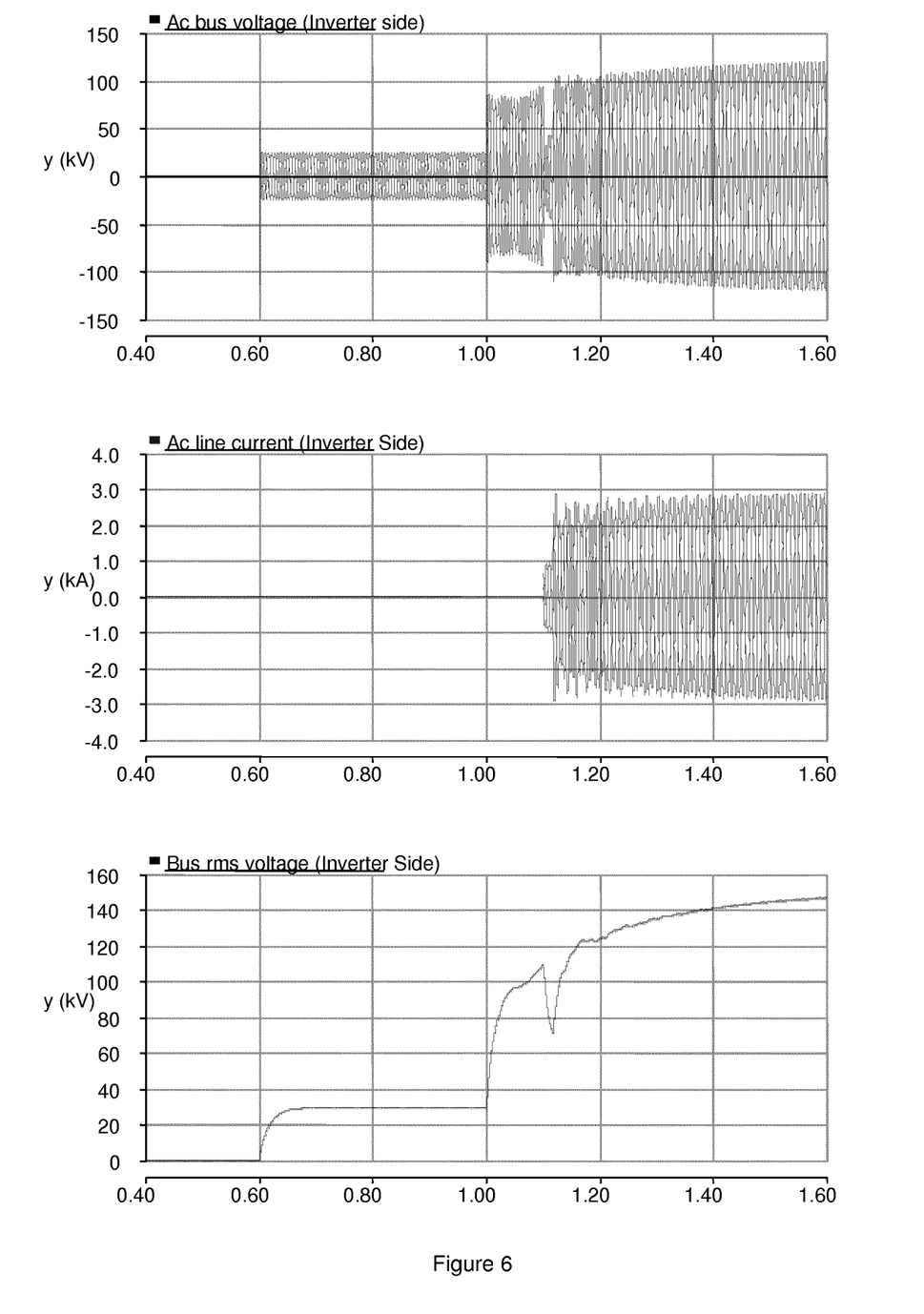
FIG. 6 illustrates the simulated converter line winding waveforms.
Figure 7:
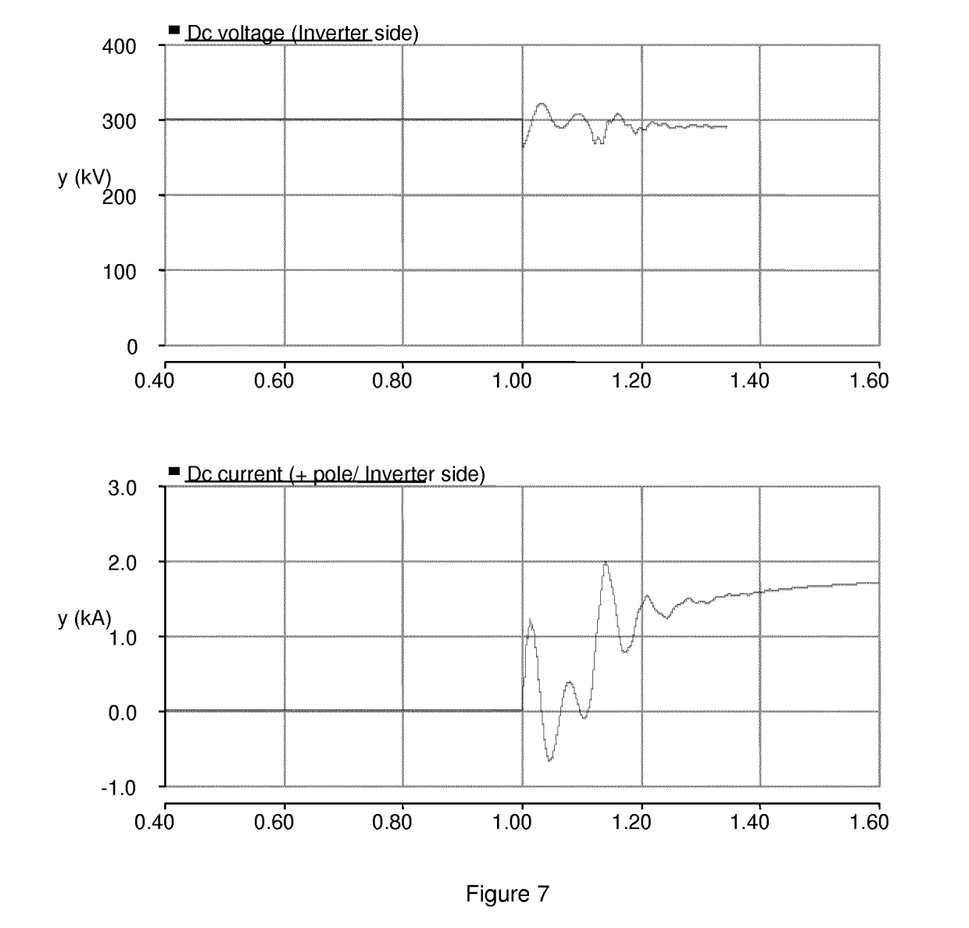
FIG. 7 illustrates the simulated the DC waveforms for the positive DC pole.

FIG. 4 illustrates the waveforms for the auxiliary AC power supply at the transformer. The top plot illustrates the AC voltages at the terminals of the transformer tertiary winding the middle plot the AC currents and the lower plot the active and reactive power of the auxiliary supply. FIG. 5 illustrates the converter valve winding waveforms of voltage (top) and current (bottom). FIG. 6 illustrates the converter line winding waveforms illustrating the AC bus voltage (top plot), AC line current (middle plot) and bus rms voltage (lower plot). FIG. 7 shows the DC waveforms for the positive DC pole showing voltage (top plot) and current (lower plot).

The auxiliary AC power supply 208 is turned on at t=0.5 s with switch $S_{A1}$ closed and the auxiliary loads energized. The auxiliary supply breaker, i.e. $S_{A2}$, to the transformer is closed at t=0.6 s. As can be seen from FIG. 4 the auxiliary AC power supply provides a regular AC voltage and provides power for the VSC loads. As can be seen from FIG. 5 the transformer is thus energized and the secondary (valve) winding voltage, i.e. the VSC side voltage, reaches approximately 0.2 p.u. reflecting the voltage drop due to the transformer magnetizing current and the tertiary current limiting resistor. There is no significant valve side AC current at this stage. As illustrated in 6 the transformer primary (line) winding voltage i.e. the voltage on the AC side reflects the valve winding voltage and is approximately 0.2 p.u, again with no significant current.

At t=1.0 s the converter is deblocked and starts operating which thus increases the secondary voltage, i.e. the valve winding or VSC side voltage, as can be seen from FIG. 5 (but again without any significant current). Again, FIG. 6 shows that the AC side voltage follows. The AC bus rms voltage thus starts increasing.

At t=1.1 Os the main converter breaker 204 is closed into a "dead" AC system consisting of a passive network of resistance and inductance (nominally Pac=1.0 p.u, pf=0.95).

At this stage the soft-start resistor(s) are still connected in series. The AC bus voltage experiences a transient voltage drop before recovering and ramping up. The AC current increases but the inrush current is limited by the soft-start resistances.

At t=1.117 s the "soft start" resistors are bypassed and at t=1.2 s the auxiliary supply breaker $S_{A1}$ is opened, to disconnect the auxiliary AC power supply and switch $S_{A3}$ closed, the auxiliary loads are now supplied entirely from the main converter tertiary.

On the DC side FIG. 7 illustrates that there is a voltage and current transient at t=1.0 s when the converter is deblocked and further transients when the AC breaker is opened but within the operating parameters of the HVDC system. FIG. 7 illustrates that the DC voltage is maintained at its rated value (300 kV) although it should be noted that the methods of start-up are not dependent on the DC voltage and a DC voltage other than the rated value could be used during the start-up process if desired.

It should be noted that all of timings discussed above are for the purposes of example only and the exact timings or relatively timings are non-critical and can be changed. For example, the closing of the AC breaker and connection of the AC system may be delayed until the converter has achieved rated AC voltage.

Embodiments of the present invention therefore provide methods and apparatus for start-up of a VSC that does not rely on the connected AC network. The VSC can be energized by a working DC system to which the VSC is connected. The VSC can be started with reference to an auxiliary AC power source which can also supply power for the various VSC converter station loads that need to be operational to start the VSC. The VSC can be started and then subsequently synchronized to a working AC network before connection to said network. Alternatively, the VSC may be started as part of a black start process for a connected AC network without power, in which case the VSC transformer may be energized, and the VSC started, before connecting the dead AC network.

The methods and apparatus of embodiments of the present invention thus ensure that there is a pre-existing ac system for the VSC to start into, whilst possibly also providing a power supply for the VSC auxiliaries, e.g. cooling plant and/or control and protection systems, to be running. These auxiliary loads can be running prior to the energization of the VSC converter from the DC system. The methods ensure that prior to connection to the AC network via the main ac breaker, the VSC control system is provided with suitable control and timing signals. The VSC control system is also provided with suitable control and timing signals when feeding a passive AC system, such as a dead AC network. It should be noted that the converter start procedure is independent of the precise DC voltage and therefore independent upon the operation of the rest of the DC Grid. Starting the VSC in this manner can provide reduced inrush currents associated with energization of the converter transformer, compared to the conventional approaches such as energizing from the AC system. The use of current limiting or soft start resistors in either the AC and/or the DC connections can also be used to limit current inrush when starting into an unknown AC system.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of start-up of a voltage source converter which is connected to: an energized DC link and a first AC network via a first transformer and an AC isolation switch, the AC isolation switch being coupled between the first transformer and the first AC network; the method comprising:

determining that the first AC network is without power;
using, based on the determination that the first AC network is without power, an auxiliary AC power supply to generate an AC supply to energize the first transformer with the AC isolation switch open;
starting the voltage source converter using a waveform of the AC supply generated by the auxiliary AC power supply as a reference for controlling the voltage source converter; and
closing the AC isolation switch after the voltage source converter has been started using the waveform of the AC supply generated by the auxiliary AC power supply as a reference for controlling the voltage source converter.

2. A method according to claim 1, further comprising powering at least one load of the voltage source converter using the auxiliary AC power supply.

3. A method according to claim 2, wherein the at least one load comprises at least one of: a controller for the voltage source converter; and a cooling system for the voltage source converter.

4. A method according to claim 2, wherein the auxiliary AC power supply is connected to the first transformer via an auxiliary power isolation switch and said auxiliary power isolation switch is closed only after the auxiliary AC power supply is powering said at least one load of the voltage source converter.

5. A method according to claim 1, wherein the auxiliary AC power supply is coupled to a winding of the first transformer.

6. A method according to claim 1, wherein the auxiliary AC power supply is coupled to a node between the voltage source converter and the AC isolation switch via an auxiliary transformer.

7. A method according to claim 1, further comprising closing the AC isolation switch when the voltage source converter is synchronized to the first AC network.

8. A method according to claim 1, wherein the auxiliary AC power supply is operating and connected to the first transformer at a point when the AC isolation switch is closed.

9. A method according to claim 1, wherein at least one current limiting resistor is connected in series with the voltage source converter at a point when the AC isolation switch is closed and the method comprises subsequently bypassing said at least one current limiting resistor.

10. A method according to claim 1, wherein the method is part of a black start process of the first AC network, wherein the black start process-further comprises using AC power provided by the voltage source converter to the first AC network to start at least one additional AC generator connected to the first AC network.

11. An apparatus for start-up of a voltage source converter connected to an energized DC comprising:
   a first transformer coupled to the voltage source converter;
   an AC isolation switch coupled between the first transformer and a first AC network;
   an auxiliary AC power supply, wherein, when the first AC network is without power, the AC isolation switch is configured to be closed after the voltage source converter has been started using a waveform of the AC power supply generated by the auxiliary AC power supply as a reference for controlling the voltage source converter; and
   a start-up controller for operating said auxiliary AC power supply to generate an AC supply, based on a determination that the first AC network is without power, to energize the first transformer with the AC isolation switch open.

12. An apparatus according to claim 11, wherein the auxiliary AC power supply is configured to supply power to at least one load of the voltage source converter.

13. An apparatus according to claim 11, wherein a VSC controller is configured to control the voltage source converter using the AC supply generated by the auxiliary AC power supply as a reference.

* * * * *